United States Patent
Kajita

(10) Patent No.: US 6,900,320 B2
(45) Date of Patent: May 31, 2005

(54) PERSONAL INFORMATION CONTROL SYSTEM

(75) Inventor: Kuniyuki Kajita, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 377 days.

(21) Appl. No.: 10/088,055

(22) PCT Filed: Jul. 24, 2001

(86) PCT No.: PCT/JP01/06385

§ 371 (c)(1),
(2), (4) Date: Jun. 6, 2002

(87) PCT Pub. No.: WO02/09401

PCT Pub. Date: Jan. 31, 2002

(65) Prior Publication Data

US 2002/0155824 A1 Oct. 24, 2002

(30) Foreign Application Priority Data

Jul. 24, 2000 (JP) .................................. 2000-222589

(51) Int. Cl.[7] ............................................. H04M 1/68
(52) U.S. Cl. .................... 544/411; 455/411; 455/412.1; 455/412.2
(58) Field of Search ................................ 455/410–412, 455/573, 186.1, 550.1, 412.1, 412.2, 414.1

(56) References Cited

U.S. PATENT DOCUMENTS 6,249,690 B1 * 6/2001 Mashiko ..................... 455/573
6,553,217 B1   4/2003 Kundorf
2003/0028493 A1 * 2/2003 Tajima et al. .................. 705/67
2003/0132299 A1 * 7/2003 Rhee ........................... 235/487

FOREIGN PATENT DOCUMENTS

| JP | 05336563 | 12/1993 |
| JP | 08182052 | 7/1996 |
| JP | 05259929 | 10/1996 |
| JP | 11355442 | 12/1999 |

* cited by examiner

Primary Examiner—CongVan Tran
(74) Attorney, Agent, or Firm—Stevens, Davis, Miller & Mosher, LLP

(57) ABSTRACT

A personal information control system that makes it easy to carry out a shift of personal information accompanying to a replacement of a portable telephone apparatus with a new one by carrying out control and maintenance of the personal information. The mobile station apparatus 100 comprises a user interface 110 that exchanges information with a user, a transmitting/receiving section 120 that carries out communication with a base station apparatus 200 via an antenna 150, a memory that stores personal information and its own user identification number and a control section 140 that controls the respective operations of the foregoing sections. On the other hand, the base station apparatus 200 comprises a transmitting/receiving section 220 that carries out communication with the mobile station apparatus 100 via an antenna 210, a memory 230 that stores the personal information while coupling it to the user identification number, which is provided with a memory area having the same number as the previously registered user identification number, and a control section 240 that controls the respective operations of the foregoing sections.

13 Claims, 3 Drawing Sheets

PERSONAL INFORMATION CONTROL SYSTEM

TECHNICAL FIELD

The present invention relates to a personal information control system in a mobile communication.

BACKGROUND ART

In a conventional mobile communication, a portable telephone apparatus, by which personal information such as telephone numbers, electric mail addresses and transmission/arrival sounds or the like are stored and each user controls them, is known.

As a control method like this, for example, a method which is disclosed in Japanese Laid-Open Patent Publication No.HEI 5-259929; "RADIO RECEIVING APPARATUS AND A METHOD OF ADAPTIVELY CONTROLLING THE OPERATION PARAMETER" is known. In this controlling method, the operation characteristics are improved in such manner that a specific reception mode is received when a first error criterion exceeds a predetermined criterion so as to adaptively control the intermodulation distortion of a radio receiving apparatus.

However, since a portable telephone apparatus has a short service life as a commodity and as a machine (approximately, for 1–2 years), many users replace his/her portable telephone apparatus frequently with a new one, and since it is necessary to store the personal information into the apparatus manually, or it is necessary to store them in the apparatus using a dedicated data rewriting apparatus, and so on, sometimes it requires troublesome operations. Further, when the personal information is written using a dedicated writing apparatus, in many cases, the information may be erroneously lost.

DISCLOSURE OF INVENTION

An object of the present invention is to provide a personal information control system that makes it easy to carry out the shift of personal information accompanying to a replacement of the portable telephone apparatus with a new one or the like, by carrying out control and maintenance of the personal information.

According to a form of the present invention, a mobile station apparatus comprises storing means for storing personal information and its own user identification information, determining means for determining whether a user-operated input is a personal information externally storing mode in which the personal information stored in said storing means is made to be transmitted and stored externally or a personal information re-storing mode in which the personal information temporarily stored externally is received by and re-stored in said storing means, and controlling means for making the personal information and the user identification information stored in said storing means be transmitted when the user-operated input is the personal information externally storing mode, and for making the personal information corresponding to the own user identification information, which is temporarily stored externally, be received and stored in said storing means when the user-operated input is the personal information re-storing mode.

According to another form of the present invention, a base station apparatus includes storing means for storing personal information and user identification information while coupling them to each other, determining means for determining whether a received signal is a personal information externally storing mode signal or a personal information re-storing mode signal, and controlling means for making the personal information and the user identification information, which are received along with the relevant personal information externally storing mode signal, be stored in said storing means while coupling them to each other when the received signal is the personal information externally storing mode signal; and for making the personal information corresponding to the user identification information, which has been received along with the relevant personal information re-storing mode signal, be read out from said storing means and transmitted to a transmitting source of the relevant personal information re-storing mode signal when the received signal is the personal information re-storing mode signal.

According to further another form of the present invention, a control station apparatus, which is connected with a plurality of base station apparatus, includes storing means for storing personal information and user identification information while coupling them to each other, determining means for determining whether a signal received by a base station apparatus is a personal information externally storing mode signal or a personal information re-storing mode signal, and controlling means for making the personal information and the user identification information, which are received along with the relevant personal information externally storing mode signal, be stored in said storing means while coupling them to each other when the signal received by the base station is the personal information externally storing mode signal; and for making the personal information corresponding to the user identification information, which has been received from said storing means along with the relevant personal information re-storing mode signal, be read out from said storing means and transmitted to a transmitting source of the relevant personal information re-storing mode signal via the base station apparatus when the signal received by the base station apparatus is the personal information re-storing mode signal.

BEST MODE FOR CARRYING OUT THE INVENTION

The main point of the present invention is to make it easy to carry out the shift of personal information accompanying to a replacement of a mobile station apparatus with a new one or the like, by making the personal information, which is stored in a mobile station apparatus, be temporarily stored and controlled by a base station apparatus and/or a control station apparatus.

(First Embodiment)

Figure 1:
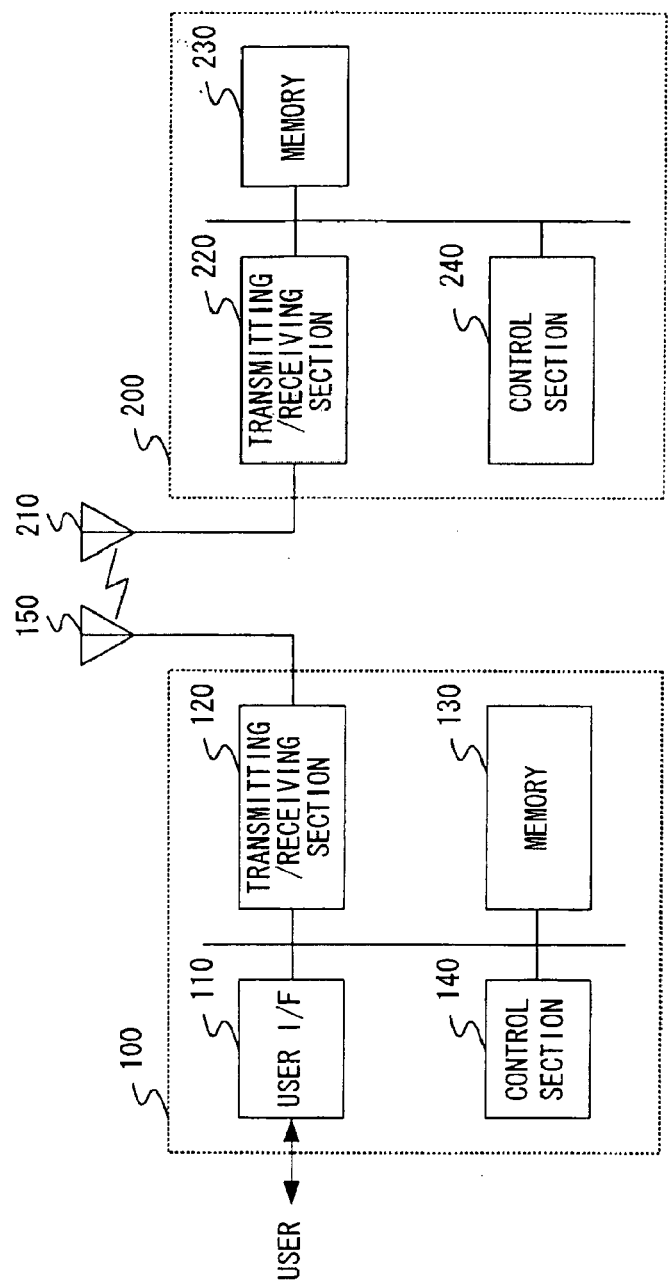
FIG. 1 is a block diagram showing a configuration of a personal information control system according to a first embodiment of the invention.

Now, a description will be made as to a personal information control system according to a first embodiment of the present invention. FIG. 1 is a block diagram showing a configuration of a personal information control system according to the first embodiment of the invention.

The personal information control system shown in FIG. 1 comprises a mobile station apparatus 100 and a base station apparatus 200.

The mobile station apparatus 100 comprises a user interface 110 that exchanges information with a user, a transmitting/receiving section 120 that carries out communication with the base station apparatus 200 via an antenna 150, a memory 130 that stores personal information and its own user identification number, and a control section 140 that controls the respective operations of the foregoing sections.

On the other hand, the base station apparatus 200 comprises a transmitting/receiving section 220 that carries out communication with the mobile station apparatus 100 via an antenna 210, a memory 230, which is equipped with a memory area having the same number as a previously registered user identification number, that stores personal information while coupling it with a user identification number, and a control section 240 that controls the respective operations of the foregoing sections.

Next, separating into a case that the user makes personal information be stored and a case that the user makes a call for the personal information, a description will be made as to the operation of the personal information control system having the configuration as described above.

In the case that the user makes the personal information be stored, first of all, the user carries out an operation, which is equivalent to "make the personal information be stored", using a user interface 110 such as keys or the like. Then, the control section 140 makes a signal, which is equivalent to "make the personal information be stored", be generated, and reads out personal information and its own user identification number from the memory 130, which are previously stored therein, and then, makes the transmitting/receiving section 120 carry out a predetermined radio processing such as coding or the like on the signal equivalent to "make the personal information be stored" and the personal information and its own user identification number, and transmit them to the base station apparatus 200.

The transmitted signal is received by the transmitting/receiving section 220 via the antenna 210 of the base station apparatus 200, and is subjected to a predetermined radio processing such as decoding or the like. When the control section 240 recognizes that the received signal includes the signal equivalent to "make the personal information be stored", the control section 240 acquires the personal information and the user identification number from the received signal and detects a memory area that has the same number as the acquired user identification number from the memory 230, and makes the personal information be stored in the relevant memory area.

After making the personal information be stored properly in the memory 230, the control section 240 makes a signal which is equivalent to "succeeded in storing" be generated, and after making the signal be subjected to a predetermined radio processing such as coding or the like, the control section 240 makes the signal be transmitted to the mobile station apparatus 100.

Also, when the control section 240 has failed in detecting the memory area having the same number as the acquired user identification number from the memory 230, the control section 240 makes a signal equivalent to "repeat the user identification number" be generated and after making the signal be subjected to a predetermined radio processing such as coding or the like in the transmitting/receiving section 220, the control section 240 makes the signal be transmitted to the mobile station apparatus 100.

The signal equivalent to "succeeded in storing" or "repeat the user identification number", which have been transmitted from the transmitting/receiving section 220 of the base station apparatus 220 is received by the transmitting/receiving section 120 via the antenna 150 of the mobile station apparatus 100 and subjected to a predetermined radio processing such as decoding or the like. When the control section 140 recognizes that the received signal is the signal equivalent to "succeeded in storing", the control section 140 notices the user that the personal information has been stored properly via the user interface 110 such as a display, a speaker or the like.

Also, when the control section 140 recognizes that the received signal is the signal equivalent to "repeat the user identification number", the control section 140 reads out the personal information and its own user identification number again from the memory 130, and makes them be transmitted from the transmitting/receiving section 120. After that, the above operation is repeated until the mobile station apparatus 100 receives the signal equivalent to "succeeded in storing".

In the case that the user makes a call for the personal information, first of all, the user carries out an operation equivalent to "make the personal information be transmitted" using the user interface 110 such as keys or the like. Then, the control section 140 makes a signal equivalent to "make the personal information be transmitted" be generated, and reads out its own user identification number previously stored from the memory 130, and after making the transmitting/receiving section 120 carry out a predetermined radio processing such as coding or the like on the signal equivalent to "make the personal information be transmitted" and its own user identification number, the control section 140 makes them be transmitted to the base station apparatus 200.

The transmitted signal is received by the transmitting/receiving section 220 via the antenna 210 of the base station apparatus 200, and subjected to a predetermined radio processing such as decoding or the like. When the control section 240 recognizes that the received signal includes the signal equivalent to "make the personal information be transmitted", the control section 240 acquires the user identification number from the received signal, detects a memory area which has the same number as the acquired user identification number from the memory 230 and reads out the personal information from the relevant memory area. After making the read out personal information be subjected to a predetermined radio processing such as coding or the like in the transmitting/receiving section 220, the control section 240 makes the personal information be transmitted to the mobile station apparatus 100.

Also, when the control section 240 has failed in detecting the memory area which has the same number as the acquired user identification number, the control section 240 makes the signal equivalent to "repeat the user identification number" be generated, and after making the signal be subjected to a predetermined radio processing in the transmitting/receiving section 220, the control section 240 makes the signal be transmitted to the mobile station apparatus 100.

The personal information signal or the signal equivalent to "repeat the user identification number" transmitted from the transmitting/receiving section 220 of the base station apparatus 200 is received by the transmitting/receiving section 120 via the antenna 150 of the mobile station apparatus 100 and subjected to a predetermined radio processing such as decoding or the like. When the control section 140 recognizes that the received signal is the personal information signal, the control section 140 makes it be stored in the memory 130 and notices the user that the personal information has been stored properly via the user interface 110 such as the display, the speaker or the like.

Also, when the control section 140 recognizes that the received signal is the signal equivalent to "repeat the user identification number", the control section 140 reads out its own user identification number from the memory 130 and makes the user identification number be transmitted from the transmitting/receiving section 120 along with the signal equivalent to "make the personal information be transmitted". After that, the above operation is repeated until the mobile station apparatus 100 receives the personal information signal.

According to the personal information control system of the first embodiment, since the user can temporarily store the personal information such as telephone numbers and mail addresses or the like, which are stored in his/her own portable terminal, in the base station, it is enabled to carry out easily and reliably the shift of the personal information accompanying a replacement of the portable terminal with a new one or the like.

(Second Embodiment)

Figure 2:
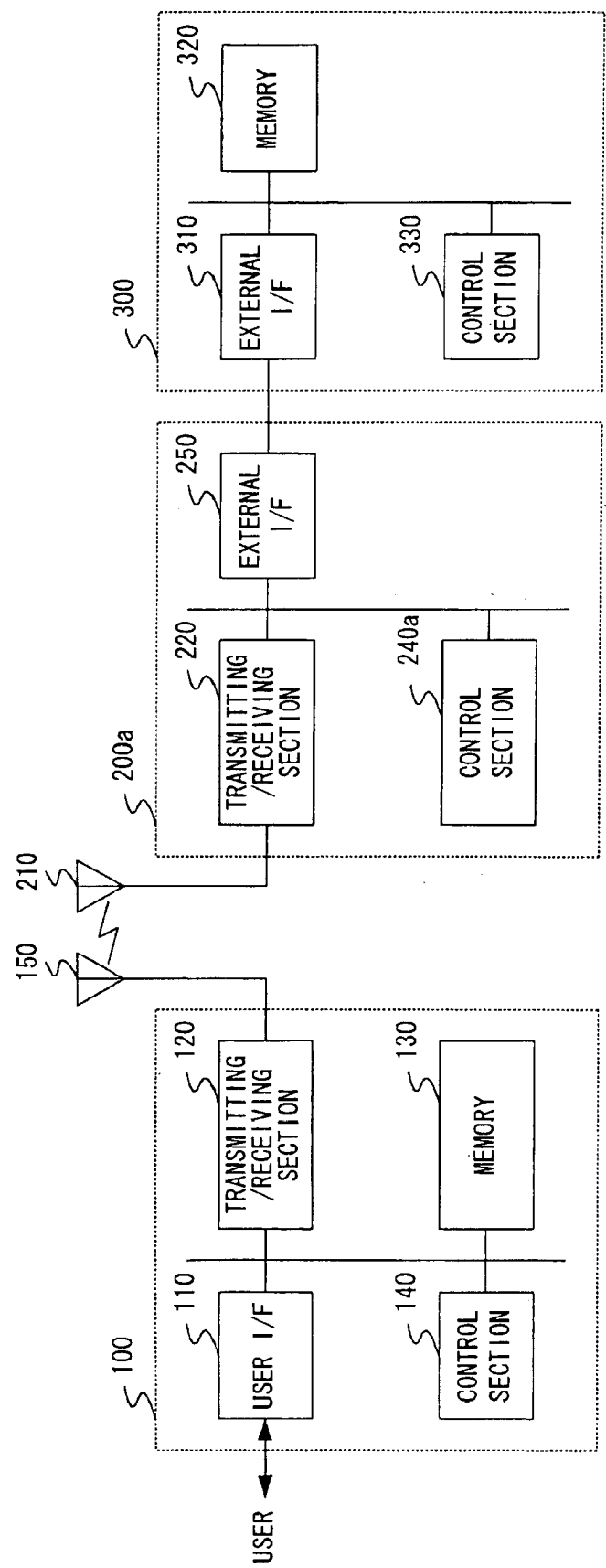
FIG. 2 is a block diagram showing a configuration of a personal information control system according to a second embodiment of the invention.

Now, a description will be made as to a personal information control system according to a second embodiment of the present invention. The characteristic of the second embodiment is the point that personal information transmitted from a mobile station apparatus is made to be stored in a control station apparatus. FIG. 2 is a block diagram showing a configuration of the personal information control system according to the second embodiment. In the personal information control system shown in FIG. 2, the parts, which are the same as those shown in FIG. 1, are given with the same reference numerals, and the description thereof will be omitted.

The personal information control system shown in FIG. 2 comprises a mobile station apparatus 100, a base station apparatus 200a and a control station apparatus 300.

The base station apparatus 200a comprises a transmitting/receiving section 220 that carries out the communication with the mobile station apparatus 100 via an antenna 210, an external interface 250 that carries out a wire transmission with the control station apparatus 300 and a control section 240a that controls the respective operations of the foregoing sections.

Also, the control station apparatus 300 comprises an external interface 310 that carries out a wire transmission with the base station apparatus 200a, a memory 320, which is provided with a memory area having the same number as a previously registered user identification number, that stores the personal information while coupling it to a user identification number, and a control section 330 that controls the respective operations of the foregoing sections.

Next, separating into a case that the user makes the personal information be stored and a case that the user makes a call for the personal information, a description will be made as to the operation of the personal information control system having the configuration as described above.

In the case that the user makes the personal information be stored, first of all, the user carries out an operation equivalent to "make the personal information be stored" using the user interface 110 such as keys or the like. Then, the control section 140 makes a signal equivalent to "make the personal information be stored" be generated and reads out a previously stored personal information and its own user identification number from the memory 130, and after making the transmitting/receiving section 120 carry out a predetermined radio processing such as coding or the like on the signal equivalent to "make the personal information be stored", the personal information and its own user identification number, the control section 140 makes them be transmitted.

The transmitted signal is received by the transmitting/receiving section 220 via the antenna 210 of the base station apparatus 200a and subjected to a predetermined radio processing such as decoding or the like. When the control section 240a recognizes that the signal has been received by the transmitting/receiving section 220, the control section 240a makes the signal after being subjected to the predetermined radio processing be output to the external interface 250 and makes the signal be wire-transmitted to the control station apparatus 300 from the external interface 250.

The wire-transmitted signal is received by the external interface 310 of the control station apparatus 300. When the control section 330 recognizes that the received signal includes the signal equivalent to "make the personal information be stored", the control section 330 acquires the personal information and the user identification number from the received signal and detects a memory area which has the same number as the acquired user identification number from the memory 320, and makes the personal information be stored in the relevant memory area.

When the control section 330 has succeeded in storing the personal information properly in the memory 320, the control section 330 makes a signal equivalent to "succeeded in storing" be generated, and makes the signal be wire-transmitted to the base station apparatus 200a via the external interface 310.

Also, when the control section 330 has failed in detecting the memory area which has the same number as the acquired user identification number from the memory 320, the control section 330 makes a signal equivalent to "repeat the user identification number" be generated, and makes it be wire-transmitted to the base station apparatus 200a from the external interface 310.

The signal equivalent to "succeeded in storing" or "repeat the user identification number", which is wire-transmitted from the external interface 310 of the control station apparatus 300, is received by the external interface 250 of the base station apparatus 200a. When the control section 240a recognizes that the signal has been received by the external interface 250, the control section 240a makes the relevant signal be transmitted to the transmitting/receiving section 220. Further, after making the relevant signal be subjected to a predetermined radio processing such as coding or the like in the transmitting/receiving section 220, the control section 240a makes the signal be transmitted to the mobile station apparatus 100.

The signal equivalent to "succeeded in storing" or "repeat the user identification number" transmitted from the transmitting/receiving section 220 of the base station apparatus 200a is received by the transmitting/receiving section 120 via the antenna 150 of the mobile station apparatus 100 and subjected to a predetermined radio processing such as decoding or the like. When the control section 140 recognizes that the received signal is the signal equivalent to "succeeded in storing", the control section 140 notices the user that the personal information has been stored properly via the user interface 110 such as a display or a speaker.

Also, when the control section 140 recognizes that the received signal is the signal equivalent to "repeat the user identification number", the control section 140 reads out the personal information and its own user identification number again from the memory 130, and makes them be transmitted from the transmitting/receiving section 120. After that, the above operation is repeated until the mobile station apparatus 100 receives the signal equivalent to "succeeded in storing".

In the case that the user calls for the personal information, first of all, the user carries out an operation equivalent to "make the personal information be transmitted" using the user interface 110 such as keys or the like. Then, the control section 140 makes a signal equivalent to "make the personal information be transmitted" be generated and reads out the previously stored own user identification number from the memory 130, and after making the transmitting/receiving section 120 carry out a predetermined radio processing such as coding or the like on the signal equivalent to "make the personal information be transmitted" and its own user identification number, the control section 140 makes them be transmitted to the base station apparatus 200a.

The transmitted signal is received by the transmitting/receiving section 220 via the antenna 210 of the base station apparatus 200a and subjected to a predetermined radio processing such as decoding or the like. When the control section 240a recognizes that the signal has been received by the transmitting/receiving section 220, the control section 240a makes the signal after a predetermined radio processing be output to the external interface 250, and makes the signal be wire-transmitted to the control station apparatus 300 from the external interface 250.

The wire-transmitted signal is received by the external interface 310 of the control station apparatus 300. When the control section 330 recognizes that the received signal includes the signal equivalent to "make the personal information be transmitted", the control section 330 acquires the user identification number from the received signal, detects the memory area having the same number as the acquired user identification number from the memory 320 and reads out the personal information from the relevant memory area. The control section 330 makes the read out personal information D be wire-transmitted to the base station apparatus 200a from the external interface 310.

Also, when the control section 330 has failed in detecting the memory area having the same number as the acquired user identification number from the memory 320, the control section 330 makes a signal equivalent to "repeat the user identification number" be generated, and makes the signal be wire-transmitted to the base station apparatus 200a from the external interface 310.

The personal information signal or the signal equivalent to "repeat the user identification number", which is transmitted from the external interface 310 of the control station apparatus 300, is received by the external interface 250 of the base station apparatus 200a. When the control section 240a recognizes that the signal has been received by the external interface 250, the control section 240a makes the relevant signal be output to the transmitting/receiving section 220. After making the relevant signal be subjected to a predetermined radio processing such as coding or the like in the transmitting/receiving section 220, the control section 240a makes the signal be transmitted to the mobile station apparatus 100.

The signal transmitted from the transmitting/receiving section 220 of the base station apparatus 200a is received by the transmitting/receiving section 120 via the antenna 150 of the mobile station apparatus 100 and subjected to a predetermined radio processing such as decoding or the like. When the control section 140 recognizes that the received signal is the personal information signal, the control section 140 makes the signal be stored in the memory 130 and notices the user that the personal information has been received and stored properly via the user interface 110 such as a display or a speaker or the like.

Further, when the control section 140 recognizes that the received signal is the signal equivalent to "repeat the user identification number", the control section 140 reads out its own user identification number and makes the user identification number be transmitted along with the signal equivalent to "make the personal information be transmitted" from the transmitting/receiving section 120. After that, the above operation is repeated until the mobile station apparatus 100 receives a personal information signal.

As described above, according to the personal information control system of the second embodiment, since it is enabled for the user to temporarily store the personal information such as telephone numbers and mail addresses, which are stored in his/her own portable terminal, in the control station, it is enabled to carry out the shift of the personal information accompanying to a replacement of the portable terminal with a new one or the like reliably and easily.

Further, since the personal information is stored in the control station apparatus, it is enabled that a larger number of users receive the service.

(Third Embodiment)

Figure 3:
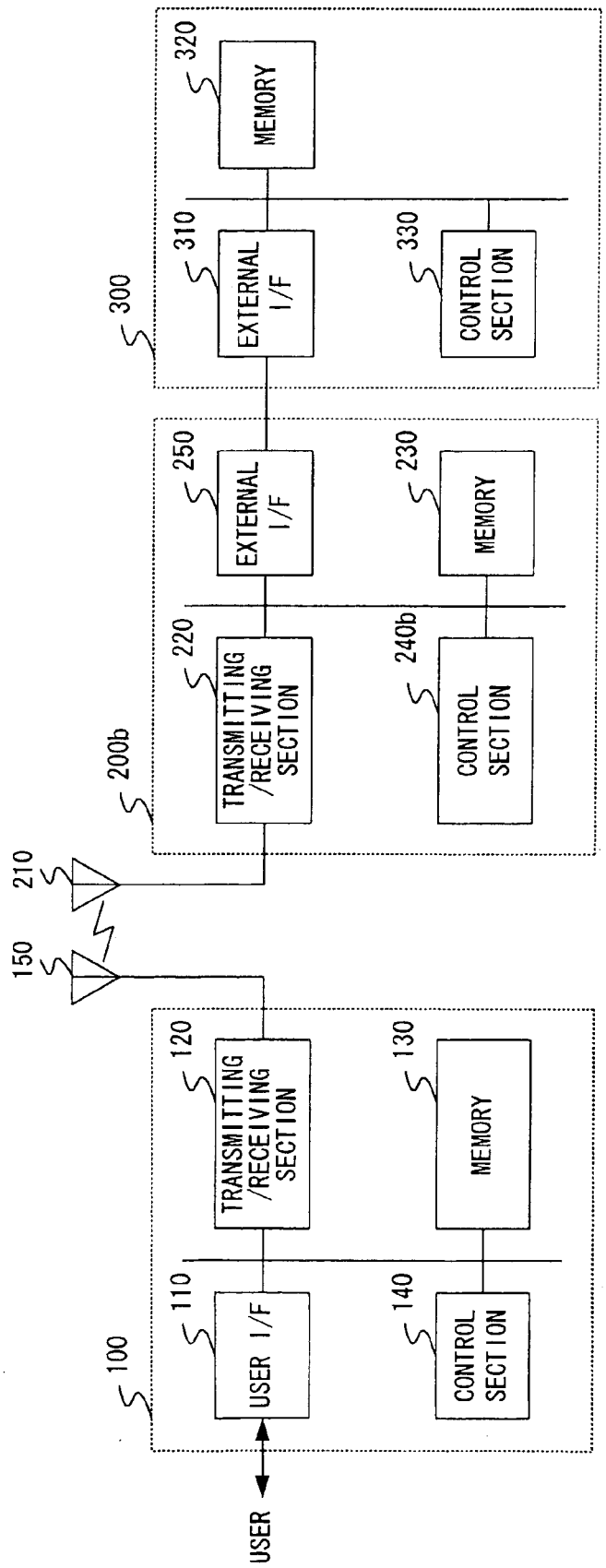
FIG. 3 is a block diagram showing a configuration of a personal information control system according to a third embodiment of the invention.

Now, a description will be made as to a personal information control system according to a third embodiment of the present invention. The characteristic of the third embodiment is the point that personal information transmitted from a mobile station apparatus is made to be stored in both of a base station apparatus and a control station apparatus. FIG. 3 is a block diagram showing a configuration of the personal information control system according to the third embodiment of the invention. In the personal information control system shown in FIG. 3, the parts, which are the same as those shown in FIG. 1 and FIG. 2, are given with the same reference numerals, and the description thereof will be omitted.

The personal information control system shown in FIG. 3 comprises a mobile station apparatus 100, a base station apparatus 200b and a control station apparatus 300.

The base station apparatus 200b comprises a transmitting/receiving section 220 that carries out communication with the mobile station apparatus 100 via an antenna 210, a memory 230, which is provided with a memory area having the same number as a user identification number of a previously registered user, that stores personal information while coupling it to a user identification number, an external interface 250 that carries out wire-transmission of a signal transmitted and received by the transmitting/receiving section 220 with a control station apparatus 300, and a control section 240b that controls the respective operation of the foregoing sections.

Next, separating into a case that the user makes the personal information be stored and a case that the user makes a call for the personal information, a description will be made as to the operation of the personal information control system having the configuration as described above.

In the case that the user makes the personal information be stored, first of all, the user carries out an operation equivalent to "make the personal information be stored" using a user interface 110 such as keys or the like. Then, a control section 140 makes a signal equivalent to "make the personal information be stored" be generated and reads out a previously stored personal information and its own user identification number from the memory 130, and after making a transmitting/receiving section 120 carry out a predetermined radio processing such as coding or the like on the signal equivalent to "make the personal information be stored", the personal information and its own user identification number, a control section 140 makes them be transmitted.

The transmitted signal is received by the transmitting/receiving section 220 via the antenna 210 of the base station apparatus 200b and subjected to a predetermined radio processing such as decoding or the like. When the control section 240b recognizes that the received signal includes a signal equivalent to "make the personal information be stored", the control section 240b acquires the personal information and the user identification number from the received signal and detects a memory area having the same number as the acquired user identification number from the memory 230, and makes the personal information be stored in the relevant memory area.

Further, the control section 240b makes the signal after the predetermined radio processing be output to the external interface 250 and makes the signal be wire-transmitted to the control station apparatus 300 from the external interface 250.

When the control section 240b has succeeded in storing the personal information properly in the memory 230, the control section 240b makes a signal equivalent to "succeeded in storing" be generated; while when the control section 240b has failed in detecting the memory area having the same number as the acquired user identification number from the memory 230, the control section 240b makes a signal equivalent to "repeat the user identification number" be generated.

While, the wire-transmitted signal is received by an external interface 310 of the control station apparatus 300. When a control section 330 recognizes that the received signal includes the signal equivalent to "make the personal information be stored", the control section 330 acquires the personal information and the user identification number from the received signal and detects the memory area having the same number as the acquired user identification number from the memory 320, and makes the personal information be stored in the relevant memory area.

When the control section 330 has succeeded in storing the personal information properly in the memory 320, the control section 330 makes the signal equivalent to "succeeded in storing" be generated, and makes the signal be wire-transmitted from the external interface 310 to the base station apparatus 200b.

Also, when the control section 330 has failed in detecting the memory are a having the same number as the acquired user identification number from the memory 320, the control section 330 makes the signal equivalent to "repeat the user identification number" be generated, and makes the signal be wire-transmitted from the external interface 310 to the base station apparatus 200b.

The signal equivalent to "succeeded in storing" or "repeat the user identification number", which is wire-transmitted from the external interface 310 of the control station apparatus 300, is received by the external interface 250 of the base station apparatus 200b. The control section 240b compares the signal received by the external interface 250 and the signal equivalent to "succeeded in storing" which has been generated when the personal information has been made to be stored in the memory 230 or "repeat the user identification number".

As a result of the comparison, when both of the signals are equivalent to "succeeded in storing", the control section 240b makes the signal equivalent to "succeeded in storing" be subjected to a predetermined radio processing such as coding or the like in the transmitting/receiving section 220, and makes the signal be transmitted to the mobile station apparatus 100.

Also, when the signal wire-transmitted from the control station apparatus 300 is equivalent to "repeat the user identification number" and the signal generated by the control section 240b is equivalent to "succeeded in storing", the control section 240b determines that a problem has occurred on the wire-transmission between the base station apparatus 200b and the control station apparatus 300, reads out the personal information and the user identification number stored in the memory 230 and makes them be transmitted again from the external interface 250. After that, the above operation is repeated until the base station apparatus 200b receives the signal equivalent to "succeeded in storing".

Also, when the signal generated by the control section 240b is equivalent to "repeat the user identification number", without depending on the content of the signal wire-transmitted from the control station apparatus 300, the control section 200b determines that a problem has occurred on the radio transmission between the mobile station apparatus 100 and the base station apparatus 200b, after making the signal equivalent to "repeat the user identification number" be subjected to a predetermined radio processing such as coding or the like in the transmitting/receiving section 220, the control section 200b makes the signal be transmitted to the mobile station apparatus 100.

The signal equivalent to "succeeded in storing" or "repeat the user identification number" transmitted from the transmitting/receiving section 220 of the base station apparatus 200b is received by the transmitting/receiving section 120 via the antenna 150 of the mobile station apparatus 100 and subjected to a predetermined radio processing such as decoding or the like. When the control section 140 recognizes that the received signal is the signal equivalent to "succeeded in storing", the control section 140 notices the user that the personal information has been stored properly via the user interface 110 such as a display or a speaker or the like.

Also, when the control section 140 recognizes that the received signal is the signal equivalent to "repeat the user identification number", the control section 140 reads out the personal information and its own user identification number again from the memory 130, and makes them be transmitted from the transmitting/receiving section 120. After that, the above operation is repeated until the mobile station apparatus 100 receives a signal equivalent to "succeeded in storing".

In the case that the user calls out the personal information, first of all, the user carries out an operation equivalent to "make the personal information be transmitted" using the user interface 110 such as keys or the like. Then, the control section 140 makes a signal equivalent to "make the personal information be transmitted" be generated and reads out the previously stored own user identification number from the memory 130, after making the transmitting/receiving section 120 carry out a predetermined radio processing such as coding or the like on the signal equivalent to "make the personal information be transmitted" and its own user identification number, the control section 140 makes them be transmitted to the base station apparatus 200b.

The transmitted signal is received by the transmitting/receiving section 220 via the antenna 210 of the base station apparatus 200b and subjected to a predetermined radio processing such as decoding or the like. When the control section 240*b* recognizes that the received signal includes the signal equivalent to "make the personal information be transmitted", the control section 240*b* acquires the user identification number from the received signal, detects the memory area having the same number as the acquired user identification number from the memory 230 and reads out the personal information from the relevant memory area. After making the read out personal information be subjected to a predetermined radio processing such as coding or the like in the transmitting/receiving section 220, the control section 240*b* makes the personal information be transmitted to the mobile station apparatus 100.

Also, when the control section 240*b* has failed in detecting the memory area having the same number as the acquired user identification number from the memory 230, the control section 240*b* makes the signal after the predetermined radio processing in the transmitting/receiving section 220 be output to the external interface 250, and makes the signal be wire-transmitted from the external interface 250 to the control station apparatus 300.

The wire-transmitted signal is received by the external interface 310 of the control station apparatus 300. When the control section 330 recognizes that the received signal includes the signal equivalent to "make the personal information be transmitted", the control section 330 acquires the user identification number from the received signal and detects the memory area having the same number as the acquired user identification number from the memory 320 and reads out the personal information from the relevant memory area. The control section 330 makes the read out personal information be wire-transmitted from the external interface 310 to the base station apparatus 200*b*.

Also, when the control section 330 has failed in detecting the memory area having the same number as the acquired user identification number from the memory 320, the control section 330 makes the signal equivalent to "repeat the user identification number" be generated, and makes the signal be wire-transmitted from the external interface 310 to the base station apparatus 200*b*.

The personal information signal or the signal equivalent to "repeat the user identification number", which is wire-transmitted from the external interface 310 of the control station apparatus 300 is received by the external interface 250 of the base station apparatus 200*b*. When the control section 240*b* recognizes that the signal has been received by the external interface 250, the control section 240*b* makes the relevant signal be output to the transmitting/receiving section 220. After making the relevant signal be subjected to a predetermined radio processing such as coding or the like in the transmitting/receiving section 220, the control section 240*b* makes the signal be transmitted to the mobile station apparatus 100.

The personal information signal or the signal equivalent to "repeat the user identification number", which is transmitted from the transmitting/receiving section 220 of the base station apparatus 200*b*, is received by the transmitting/receiving section 120 via the antenna 150 of the mobile station apparatus 100 and subjected to a predetermined radio processing such as decoding or the like. When the control section 140 recognizes that the received signal is the personal information signal, the control section 140 makes the personal information be stored in the memory 130 and notices the user that the personal information has been stored properly via the user interface 110 such as a display, a speaker or the like.

Also, when the control section 140 recognizes that the received signal is the signal equivalent to "repeat the user identification number", the control section 140 reads out its own user identification number from the memory 130, and makes the user identification number be transmitted along with the signal equivalent to "make the personal information be transmitted" from the transmitting/receiving section 120. After that, the above operation is repeated until the mobile station apparatus 100 receives the personal information signal.

As described above, according to the personal information control system of the third embodiment, since it is enabled for the user to temporarily store the personal information such as telephone numbers and mail addresses or the like, which are stored in his/her own portable terminal, in the base station, it is enabled to carry out the shift of the personal information accompanying to a replacement of the portable terminal with a new one reliably and easily.

Further, since the personal information is made to be stored in the base station apparatus and the control station apparatus, it is enabled a larger number of users receive the service thereof and to make the personal information be hardly lost.

As described above, according to the present invention, it is enabled to provide a personal information control system that makes it easy to carry out the shift of the personal information accompanying to a replacement of the portable telephone apparatus with a new one or the like, by carrying out control and maintenance of the personal information.

This application is based on the Japanese Patent Application No. 2000-222589 filed on Jul. 24, 2000, the entire content of which is expressly incorporated by reference herein.

INDUSTRIAL APPLICABILITY

The present invention is applicable to a personal information control system in a mobile communication.

What is claimed is:

1. A mobile station apparatus comprising:

storing means for storing personal information and its own user identification information;

determining means for determining whether a user-operated input is a personal information externally storing mode in which the personal information stored in said storing means is made to be transmitted and stored externally, or a personal information re-storing mode in which the personal information temporarily stored externally is received and re-stored in said storing means; and controlling means for making the personal information and the user identification information stored in said storing means be transmitted when the user-operated input is the personal information externally storing mode, and for making the personal information corresponding to the own user identification information, which is temporarily stored externally, be received and stored in said storing means when the user-operated input is the personal information re-storing mode.

2. A mobile station apparatus according to claim 1:

further comprising second determining means for determining whether a received signal is a user identification information repeat command or not; and said controlling means make the own user identification information stored in said storing means be repeated when the received signal is the user identification information repeat command.

3. A mobile station apparatus according to claim 1:

further comprising third determining means for determining whether a received signal is a personal information externally storing success signal or not; and said controlling means make the fact noticed to a user when the received signal is the personal information externally storing success signal.

4. A base station apparatus, comprising:

storing means for storing personal information and user identification information while coupling them to each other;

determining means for determining whether a received signal is a personal information externally storing mode signal or a personal information re-storing mode signal; and controlling means for making the personal information and the user identification information, which are received along with the personal information externally storing mode signal, be stored in said storing means while coupling them to each other when the received signal is the personal information externally storing mode signal; and for making the personal information corresponding to the user identification information, which has been received along with the personal information re-storing mode signal, be read out from said storing means and transmitted to a transmitting source of the relevant personal information re-storing mode signal when the received signal is the personal information re-storing mode signal.

5. A base station apparatus according to claim 4:

further comprising second determining means for determining whether the received user identification information has been previously registered or not; and said controlling means make a user identification information repeat command be transmitted to the transmitting source of the relevant user identification information when the received user identification information has not been previously registered.

6. A base station apparatus according to claim 4:

further comprising third determining means for determining whether the received personal information and the user identification information have been stored properly in said storing means or not in the case that the received signal is the personal information externally storing mode signal; and said controlling means make a personal information externally storing success signal be transmitted to the transmitting target of the relevant personal information externally storing mode signal when the received personal information and the user identification information have been stored properly in said storing means.

7. A control station apparatus connected with a plurality of base station apparatus comprising:

storing means for storing personal information and user identification information while coupling them to each other;

determining means for determining whether a signal received by a base station apparatus is a personal information externally storing mode signal or a personal information re-storing mode signal; and controlling means for making the personal information and the user identification information, which are received along with the personal information externally storing mode signal, be stored in said storing means while coupling them to each other when the signal received by the base station apparatus is the personal information externally storing mode signal; and for making the personal information corresponding to the user identification information, which has been received along with the personal information re-storing mode signal, be read out from said storing means and transmitted to a transmitting source of the relevant personal information re-storing mode signal via the base station apparatus when the signal received by the base station apparatus is the personal information re-storing mode signal.

8. A control station apparatus according to claim 7:

further comprising second determining means for determining whether the user identification information received by the base station has been previously registered or not; and said controlling means make a user identification information repeat command be transmitted to the transmitting source of the relevant user identification information via the base station when the user identification information received by the base station has not been previously registered.

9. A control station apparatus according to claim 7:

further comprising third determining means for determining whether the personal information and the user identification information received by the base station has been stored properly in said storing means or not in the case that the signal received by the base station is the personal information externally storing mode signal; and said controlling means make a personal information externally storing success signal be transmitted to the transmitting target of the relevant personal information externally storing mode signal via the base station when the personal information and the user identification information received by the base station has been stored properly in said storing means.

10. A personal information control system comprising a mobile station apparatus that stores personal information of a user and its own user identification information and a base station apparatus that temporarily stores personal information stored in said mobile station apparatus while coupling the personal information to user identification information:

in which said mobile station apparatus comprising:

storing means for storing personal information and its own user identification information;

determining means for determining whether a user-operated input is a personal information externally storing mode in which the personal information stored in said storing means is made to be transmitted to said base station apparatus and stored therein or a personal information re-storing mode in which the personal information temporarily stored in said base station apparatus is received and re-stored in said storing means; and controlling means for making the personal information and the user identification information stored in said storing means be transmitted when the user-operated input is the personal information externally storing mode, and for making the personal information temporarily stored in said base station apparatus corresponding to the own user identification information be received and stored in said storing means when the user-operated input is the personal information re-storing mode; and in which said base station apparatus comprising:

storing means for storing personal information and user identification information while coupling them to each other;

determining means for determining whether a received signal is a personal information externally storing mode signal or a personal information re-storing mode signal; and controlling means for making the personal information and the user identification information, which are received along with the personal information externally storing mode signal, be stored in said storing means while coupling them to each other when the received signal is the personal information externally storing mode signal; and for making the personal information corresponding to the user identification information, which has been received along with the personal information re-storing mode signal, be read out from said storing means and transmitted to said mobile station apparatus when the received signal is the personal information re-storing mode signal.

11. A personal information controlling method in a mobile station apparatus comprising storing means for storing personal information and its own user identification information, characterized in that said personal information controlling method in the mobile station apparatus comprising the steps of:

determining whether a user-operated input is a personal information externally storing mode or a personal information re-storing mode; and making the personal information and the user identification information stored in said storing means be transmitted when the user-operated input is the personal information externally storing mode, and making the personal information temporarily stored externally corresponding to the own user identification information be received and stored in said storing means when the user-operated input is the personal information re-storing mode.

12. A personal information controlling method in a base station apparatus comprising storing means for storing personal information and user identification information while coupling them to each other, characterized in that said personal information controlling method in the base station apparatus comprising the steps of:

determining whether a received signal is a personal information externally storing mode signal or a personal information re-storing mode signal; and making the personal information and the user identification information, which are received along with the personal information externally storing mode signal, be stored in said storing means while coupling them to each other when the received signal is the personal information externally storing mode signal; and making the personal information corresponding to the user identification information, which has been received along with the personal information re-storing mode signal, be read out from said storing means and transmitted to a transmitting source of the relevant personal information re-storing mode signal when the received signal is the personal information re-storing mode signal.

13. A personal information controlling method in a control station apparatus comprising storing means for storing personal information and user identification information while coupling them to each other, which is connected with a plurality of base station apparatus, characterized in that said personal information controlling method in the control station apparatus comprising the steps of:

determining whether a signal received by a base station apparatus is a personal information externally storing mode signal or a personal information re-storing mode signal; and making the personal information and the user identification information, which are received along with the personal information externally storing mode signal, be stored in said storing means while coupling them to each other when the signal received by the base station apparatus is the personal information externally storing mode signal; and making the personal information corresponding to the user identification information, which has been received along with the personal information re-storing mode signal, be read out from said storing means and transmitted to a transmitting source of the relevant personal information re-storing mode signal via the base station apparatus when the signal received by the base station apparatus is the personal information re-storing mode signal.

* * * * *